UNITED STATES PATENT OFFICE.

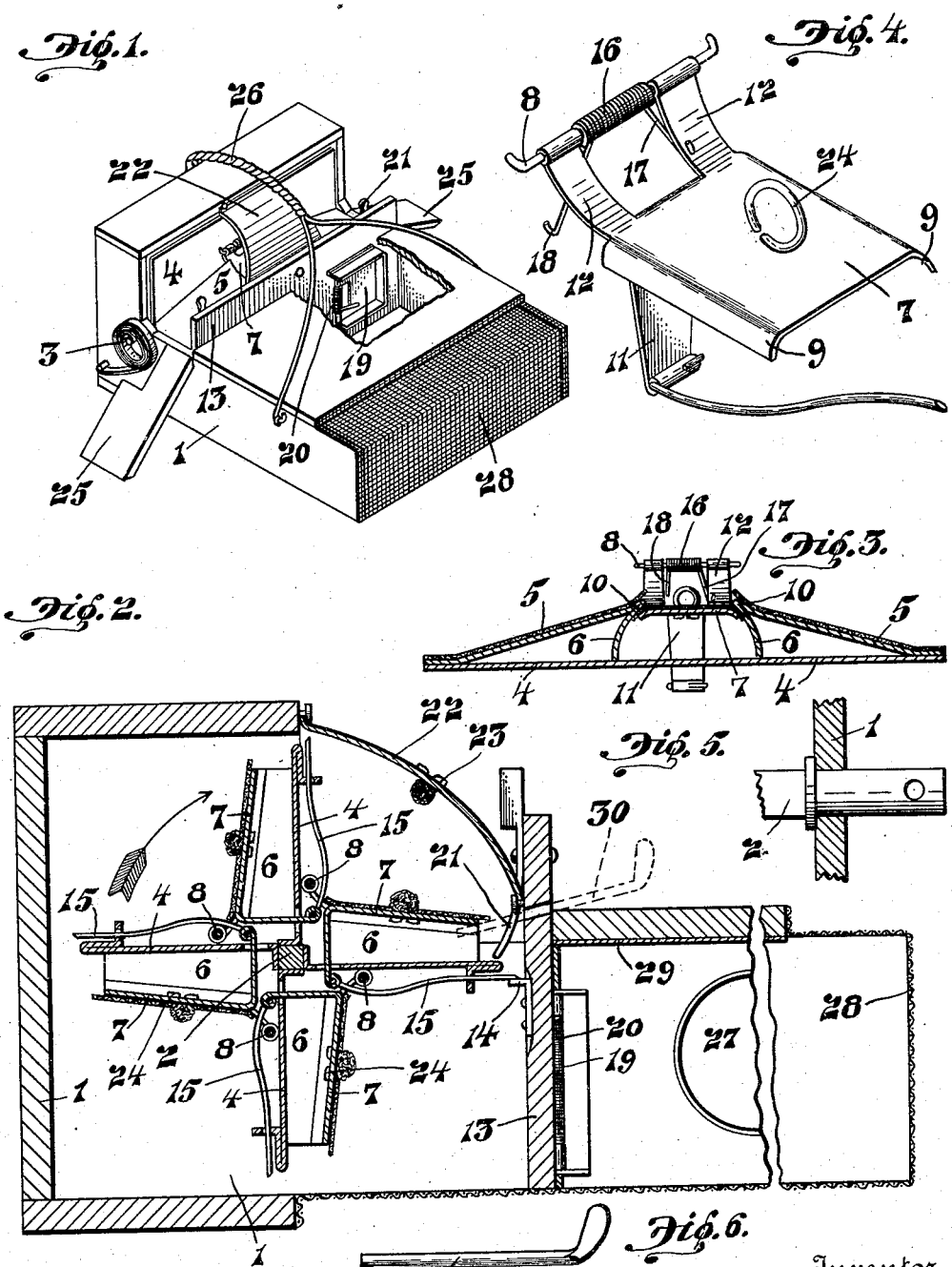

FRANK GEORGE, OF ORRVILLE, OHIO.

ANIMAL-TRAP.

1,169,950.  Specification of Letters Patent.  Patented Feb. 1, 1916.

Application filed March 31, 1915. Serial No. 18,374.

*To all whom it may concern:*

Be it known that I, FRANK GEORGE, a citizen of the United States, residing at Orrville, in the county of Wayne and State of Ohio, have invented a new and useful Animal-Trap, of which the following is a specification.

My invention relates to improvements in animal traps in which a series of radial blades or platforms are employed, said blades or platforms being mounted upon a rotary shaft and the invention further consists in providing means for releasing the blades or platforms, one at a time and in providing means for penning a number of animals after they have been trapped by the movement of the radial blades or platforms.

The object of the present invention is, first, to provide a simple and effective animal trap, and second, to provide means for holding a number of animals after they have been trapped.

A further object is to so arrange the parts that the animals will not be injured or wounded.

These objects, together with other objects readily apparent to those skilled in the art, may be attained by the construction illustrated in the accompanying drawings, although the invention may be embodied in other forms, the construction illustrated being chosen by way of example.

In the accompanying drawings: Figure 1 is a perspective view showing parts broken away. Fig. 2 is a vertical section showing a transverse section of the rotating shaft. Fig. 3 is a sectional view of one of the radial blades or platforms and its different parts. Fig. 4 is a detached enlarged view of the trip portion or member of one of the blades or platforms. Fig. 5 is a view showing a portion of the shaft. Fig. 6 is a detached view of the trip plate holding pin.

Similar numerals of reference indicate corresponding parts in all the figures of the drawing.

In the accompanying drawing 1 represents the casing which is substantially of the form shown and may be of any size, reference being had to the size of the trap designed to be constructed. The rotating shaft 2 is properly journaled in the end members of the casing 1, one end of said shaft being extended beyond the casing as best illustrated in Fig. 5, and is so formed that a winding key may be connected, it being immaterial whether said shaft is formed angular to receive a socket key or provided with an aperture to receive a key as either construction may be employed without departing from the nature of my invention. The opposite end of the shaft 2 is provided with a spring 3, which is of the ordinary clock spring construction and connected in the usual manner. To the shaft 2 are securely connected in any convenient and well known manner the radial blades 4 and for the purpose of conveniently connecting said blades, the shaft 2 is preferably formed angular in cross section as best illustrated in Fig. 2. Connected to the blades are the platforms 5, which platforms are inclined upward and inward as best illustrated in Fig. 3, and for the purpose of assisting in holding these inclined platforms in proper relative position with reference to the blades 4, the frames 6 are provided which are simply for the purpose of strengthening and holding the platform portions 5. Between the inner ends of the platforms 5 are located the trip plates 7, which trip plates are pivoted to the bars 8, which bars are secured to the blades 4. The edges of the trip plates 7 are provided with the down-turned flanges 9 which down-turned flanges are located directly below the up-turned flanges 10 located at the inner ends of the inclined platforms 5. The trip plates 7 are each provided with the arm 11, which arm is preferably formed by cutting a portion of the metal from the trip plate 11 and bending it into the position illustrated in Fig. 4, thereby, providing or leaving the parts 12 which are pivoted to the rods 8. While this construction may be varied yet the simple cutting of the arms 11 I consider the most economical way.

To the partition plate or member 13 which is located directly in front of the rotating blades or platforms is attached a catch plate 14, which catch plate is so located that it will engage the reciprocating rods 15, which reciprocating rods are connected to the arms 11.

The operation of the trap, so far as the rotary blades or platforms are concerned is as follows: The animal first travels upon one of the inclined platforms 5 which is the one located in substantially a horizontal plane as best illustrated in Fig. 2, but when the animal steps upon one of the trip plates 7, the free end of said trip plate will be pressed downward, thereby moving the rod 15 endwise and detaching the same from the catch 14 at which time the shaft 2 is rotated in the direction indicated by the arrow Fig. 2 and the animal trapped by reason of the quarter rotation of the shaft 2, which quarter rotation brings the next adjacent blade or platform into the position upon which the animal entered the trap.

For the purpose of automatically elevating the trip plates 7 after they have been depressed the springs 16 are employed and are provided with the usual tangs 17 and 18, one of said tangs being secured to each of the trip plates and the other to each of the radial blades.

In order to provide room for a number of animals, an inclosure is made of sufficient size by means of the casing 1, which chamber is located upon the opposite side of the partition 13 from that of the rotating blades or platforms and a one way swinging door 19 provided, which door is held in closed position by the ordinary spring 20. It will be understood that after the animal has been caught by the rotating of the tripping blades or platforms and has passed the one way swinging door said animal will be trapped in the chamber spaced from the mechanism connected with the rotating blades or platforms. It will be understood that by the tension of the spring 3, the shaft 2 will be rotated with more or less force and rapidity and in order to check the rotation gradually, the springs 21 are provided, which springs are so arranged that the outer edges of the blades 4 will strike said springs and thereby prevent the sudden stopping of the blades. After the blades have properly passed the lower ends of the springs 21 they will automatically assume a position such as shown in Fig. 2 and when in that position no backward movement of the blades or platforms will be permitted. In order to provide for the backward movement of the blades and platforms, together with the tripping plates, the springs 21 are pivotally connected to the partition 13 or its equivalent, so that they can be turned out of the way, at which time the shaft 2 is free to be rotated and the spring 3 wound up. The spring 3 should be of sufficient strength and size to impart a number of full revolutions to the shaft 2.

For the purpose of baiting the trap the curved blade 22 is employed, which may be detachably connected and is provided with the usual bait holding hooks or rings 23. Similar bait holding hooks or rings 24 may also be connected to the trip plate 7.

If desired suitable platforms 25 may be employed to provide means for the animals to walk upon, but such platforms are not absolutely necessary. I prefer to form the blades and platforms of metal as well as the trip plates 7 and it is well understood that some animals are timid and will not readily travel upon metal surfaces, and in order to conceal the metal I cover the tops of the inclined platforms 5 and the trip plate 7 with suitable fabric which fabric serves the double purpose of preventing noise when the trip plates 7 are actuated or the shaft 2 rotated.

For the purpose of conveniently handling the trap and carrying it from place to place the handle 26 is provided, which is connected in any convenient and well known manner. For the purpose of providing means for letting the animals out after they have been trapped an ordinary exit door 27 should be provided. I prefer to form a portion of the casing 1 of wire gauze 28. The chamber proper or at least that portion of it which is made of metal or wood should be lined with suitable fabric 29, but this is not absolutely necessary, but preferable.

In case a portion of the casing is made of wood it will be understood that a thin sheet of metal should be employed to prevent the escape of the animals by their gnawing through the wood, but regardless of the construction of the casing the inner surface should be lined with fabric. In order to prevent the trap from becoming tripped at certain times I provide a pin 30 which can be placed in the position shown in dotted lines Fig. 2 and when in that position the trip plate 7 will be held against downward movement, thereby holding the trap out of action. The object of putting the trap in condition not to be tripped so as to allow animals to enter the trap and remove the bait without being caught, thereby, in a sense educating the animals so that they will not fear the trap.

Having fully described my invention what I claim as new and desire to secure by Letters Patent, is—

1. In an animal trap, the combination of a casing, a spring actuated shaft journaled in the casing, blades secured to the spring actuated shaft, platforms secured to the blades, said platforms inclined upward from the ends of the blades, spring actuated trip-plates located intermediate the platforms, said trip-plates provided with arms, reciprocating rods pivotally attached to the arms and a catch adapted to engage the reciprocating arms.

2. In an animal trap, the combination of a casing, a spring actuated shaft journaled in the casing, blades secured to the spring actuated shaft, inclined platforms secured to the blades, spring actuated trip plates located intermediate the platforms, said trip plates provided with arms, reciprocating rods pivoted to the arms and a catch adapted to engage the reciprocating arms, a partition provided with a one-way swinging door.

3. In an animal trap of the character described, the combination of a spring actuated shaft journaled in the casing, a series of radial blades secured to a spring actuating shaft and rotatable therewith, spring actuated trip plates spaced from the blades, reciprocating rods carried by the trip plates, a catch adapted to engage the reciprocating rod and means for elevating the trip plates after they have been tripped and a spring adapted for contact with the edges of the blades.

4. In an animal trap, the combination of a casing, a partition located in the casing, said partition provided with a one-way swinging door, a spring actuating shaft provided with blades, inclined platforms carried by the blades, the tread surface of the platforms provided with fabric, trip-plates located intermediate the inclined platforms, said trip-plates provided with fabric, and means carried by the trip plates adapted for engagement with a catch secured to the partition and a spring adapted for contact with each of the blades.

5. In an animal trap of the character described, the combination of a casing provided with fabric lining, a spring actuated shaft journaled in the casing, radial blades and platforms, said platforms inclined inward and upward and spaced from the blades, trip-plates located intermediate the platforms, said trip-plates provided with down turned flanges, means for holding the spring actuated shaft against rotation and a partition located in the casing, said partition provided with a one-way swinging door.

6. In an animal trap of the class described, the combination of a casing, a spring actuated shaft provided with radial blades and platforms, a trip-plate located intermediate the ends of the platforms, a partition located in the casing, a pivoted spring adapted for engagement with the edges of the blade, said springs adapted to resist the shaft actuating spring and prevent backward movement of the blades.

7. In an animal trap of the class described, the combination of a casing provided with a fabric lining, a spring actuated shaft journaled in the casing, radial blades and radial platforms, said platforms inclined inward and upward from the outer ends of the blades, spring actuated trip-plates located intermediate the platforms, means for holding the spring actuating shaft against rotation, a partition located in the casing and means for temporarily holding the spring actuated shaft out of action.

In testimony that I claim the above, I have hereunto subscribed my name in the presence of two witnesses.

FRANK GEORGE.

Witnesses:
J. H. BISHOP,
F. W. BOND.

Copies of this patent may be obtained for five cents each, by addressing the "Commissioner of Patents, Washington, D. C."